March 30, 1943.  G. Z. VON MANTEUFFEL ET AL  2,315,167

GYROSCOPE

Filed Jan. 15, 1941

INVENTORS
G. Z. VON MANTEUFFEL
FRITZ WAACK
BY Herbert H. Thompson
THEIR ATTORNEY.

Patented Mar. 30, 1943

2,315,167

UNITED STATES PATENT OFFICE 2,315,167

GYROSCOPE

Gert Zoege von Manteuffel and Fritz Waack, Berlin, Germany; vested in the Alien Property Custodian Application January 15, 1941, Serial No. 374,528
In Germany December 6, 1939

9 Claims. (Cl. 74—5)

This invention relates to gyroscopes having three degrees of freedom which are universally supported in substantially neutral equilibrium. One particular purpose of the invention is the improvement of the gyro-verticals used on aircraft.

It is a well known fact that a neutrally supported gyroscope requires a device for the control of the position of the gyro rotor axis which, in case of tilt, causes the application of torques by which a precession is set up to turn the gyro axis into its vertical position. Usually air jets have been used for this purpose which, for instance, may be controlled by small pendulum operated shutters arranged on the gyro rotor housing and which react upon the housing as they emerge from the same. It is, however, difficult to obtain erection of the gyroscope in this manner without causing disturbances. Furthermore, the amount of air available for erection changes with altitude, whereby the speed of the precession is also changed.

It has been proposed also to use electromagnetic torque generators, which have the disadvantage that electrical contacts have to be closed in order to operate the same. The forces available for this work are very small, which results in low contact pressure and sensitivity to vibration.

According to the present invention, the disadvantages of both systems are overcome by the combination of a pneumatic impulse generator responsive to the tilt of the rotor axis with an electromagnetic torque motor which, in turn, is controlled by the impulse generator by means of a pneumatic-electric relay. In case of an electrically driven gyro, the compressed air created by the turbine action of the rotor is preferably utilized. However, this presents the difficulty that the amount of air necessary to start precession is only available when the rotor approaches its full speed, while it is desirable to have torque already available when the gyro starts and while the speed of the gyro is low, so that the axis may be quickly brought to the desired position.

A further object of the invention, therefore, is the design of the relay which controls the electric torque generator in such a way that it is sensitive to gravity, and to mount the same on the gyro rotor housing in such a way that it responds to relatively large tilts immediately in the same sense as when controlled by the impulse generator. In this way, large inclinations of the gyro axis are immediately corrected upon starting of the instrument and the device is ready for operation within the shortest possible time.

One preferred type of relay designed to fulfill the above described requirements consists of a piston which can be shifted between the control contacts, in which the piston is operated by a jet pipe pendulously suspended from the gyro rotor housing and movable between stops directly in front of control ports connected to either side of the piston relay.

An especially simple design of the reversing piston is obtained if the piston is connected to one terminal of the electric power supply and if its motion is limited on each side by a contact. In order to do this, it is necessary to have a torque motor which can be reversed by a single-pole double-throw switch. This is not the case with most three-phase torque motors used in connection with three-phase driven gyro rotors. We, therefore, prefer to use in its place a single-phase condenser motor which can be reversed by such a switch.

In order to insure functioning of the relay pistons with small tilts and thereby to obtain high accuracy, it is recommended that the jet pipes be mounted on the rotor housing for oscillation about a substantially vertical axis. In this case, very small angles of tilt are sufficient to cause appreciable jet pipe motions. After the bearing friction has been overcome, the jet pipe will move to one or the other stop and obtain the full control pressure for the piston relay. In this way, good contact pressure is guaranteed and stopping of the piston between the contacts, which would lead to arcing, is prevented.

The drawing shows a gyro horizon for aircraft.

Figures 2, 3:
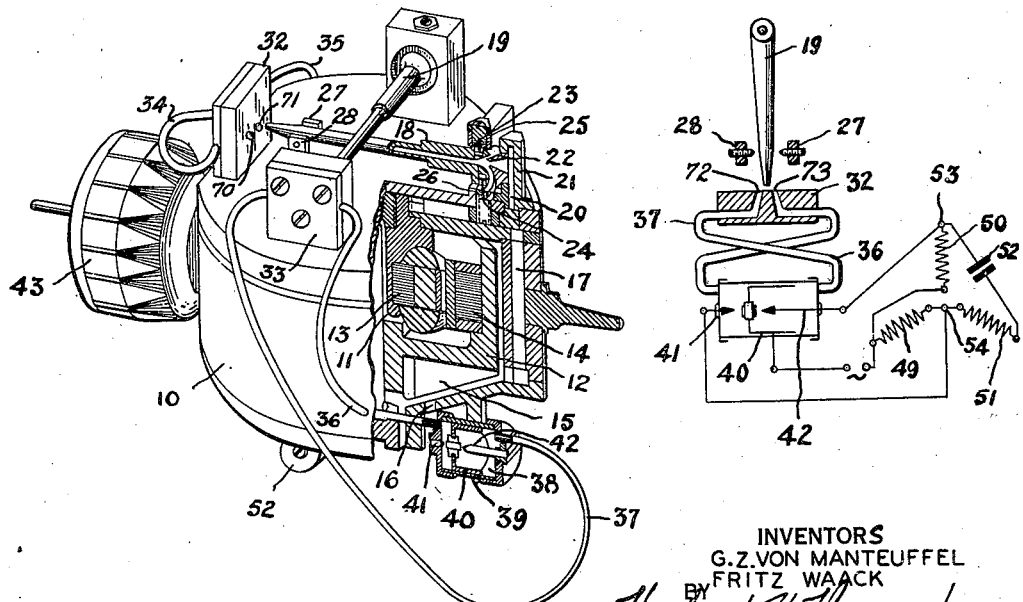
Fig. 2 is a perspective view of the rotor housing partly shown in section.
Fig. 3 is a diagram showing the electrical connections.

The rotor 12, spinning in the gyro rotor housing 10 around the vertical axis 11, is preferably driven by three-phase current. In Fig. 2, a portion of the interior field winding 13 mounted on the housing, and a portion of the squirrel cage armature 14 of the gyro drive are shown in section. On the lower part of the gyro rotor are mounted a number of equally spaced turbine impellers, one of which is visible at 15. The air is sucked into the housing through a passage 16 in the housing as soon as the rotor spins. This air is fed to the upper part of the gyro rotor housing by means of an annular passage 17.

On top of the housing 10 two crosswise arranged jet pipes 18 and 19 are mounted around vertical axes. The jet pipes are fed by air supplied from the gyro rotor. In order to show the air supply, the rear part of the jet pipe 18 is shown in section in Fig. 2. From the annular passage 17 in the rotor housing the compressed air enters into the hole 20 of a part 21 which carries a port 22. This port projects into the funnel-shaped end of the jet pipe. The jet pipe is provided with pivots 23 and 24 mounted in jewel bearings 25 and 26. Adjustable stops 27 and 28 limit the motion of the jet pipe to small angles. The port 22, therefore, may be mounted very close to the funnel-shaped end of the jet pipe. Complete closing of the air gap is not necessary, because the shape of the port and of the funnel results in the creation of negative pressure around the air gap, sucking air into the funnel.

The two jet pipes 18 and 19 are located in the vertical planes containing the gimbal axes 30—30 and 31—31, and the jets are arranged opposite the control port blocks 32 and 33, having openings 70, 71, 72 and 73. From these openings, passages 34, 35, 36 and 37 lead to opposite sides of each of the piston relays, which are arranged horizontally in the direction of motion of their corresponding jet pipes. The piston relay belonging to the jet pipe 19 is shown in section at 13 in Fig. 2.

Figure 1:
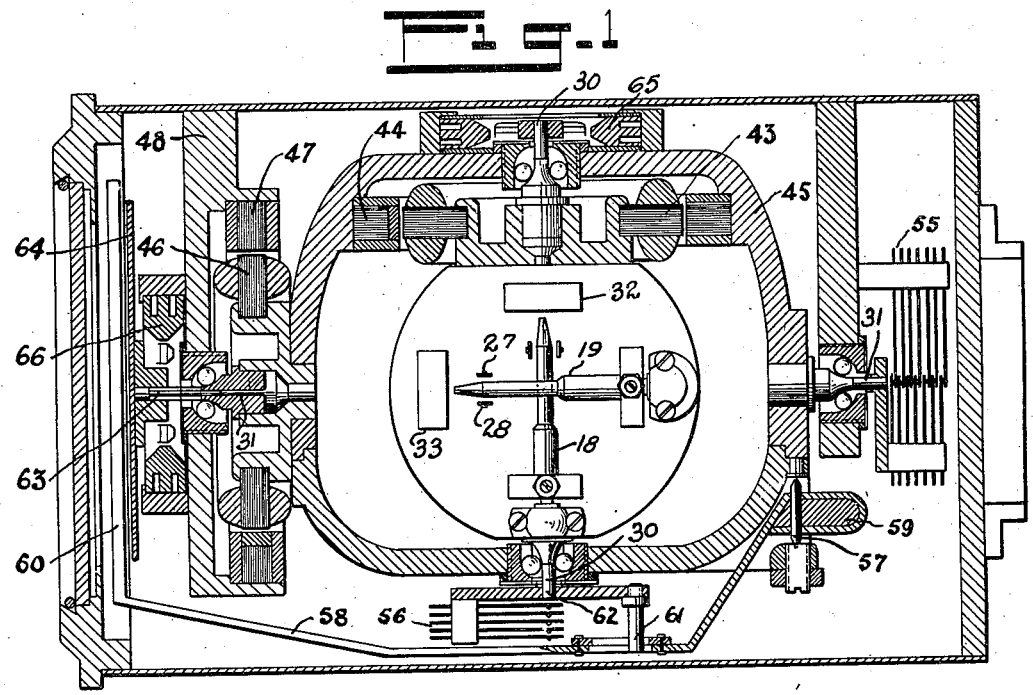
Fig. 1 is a horizontal section through the instrument, with the exception of the rotor housing, which is shown in plan view.

A piston 40 movable within the housing 39 of the relay is connected to a single phase voltage supply constituted by one phase of the three-phase current feeding the motor rotating the gyro. Depending upon the position of the piston, this phase is connected either to one or to the other of the contacts 41 or 42 mounted on but insulated from the relay housing. These contacts, as shown in Fig. 3, are connected to the windings of an electromagnetic torque motor arranged as a single-phased motor, the field laminations 43 of which are fastened to a projection of the gyro rotor housing. The squirrel cage armature 44 is attached to the gimbal frame 45, Fig. 1. In corresponding manner, the field laminations 46 of the other torque motor are mounted on the gimbal frame 45 and the corresponding armature 47 on the gimbal frame 48.

The laminations of the torque motor carry three windings 49, 50 and 51 (Fig. 3), two of which are connected by a condenser 52. Of the two terminals of the single-phase supply, leading to the torque motor, one is directly connected to the windings 49 and 50, while the other is led through the piston relay. Depending upon the position of the piston, it is connected either to the point 53 between coil 50 and the condenser 52, or to point 54 between the windings 49 and 51.

In order to explain the action of the erection device, it is supposed that the gyro has assumed a small tilt with respect to the vertical around the outer gimbal axis 31—31 to the left, so that the jet pipe 19 supplies pressure to the pipe 37. The piston 40 then moves to the left against contact 41 and supplies potential to the point 54 (Fig. 3). A rotating field is generated in the torque motor 43 which causes in the armature 44 a reacting torque around the inner gimbal axis 30—30. This causes an erecting precession of the gyro around the outer gimbal axis 31—31, whereby the tilt is eliminated.

Because of the neutral suspension of the gyro, it can assume a considerable tilt while at rest. During the starting period the air generated by the rotor is not sufficient to cause positive action of the jet pipe and the control pistons. Sufficient pressure for this action is only available as the gyro approaches its full speed, as for economic reasons the amount of air pressure generated is limited to that necessary at highest altitudes.

The pistons are so mounted that they are sensitive to gravity, i. e., each cylinder extends normally horizontally in the plane of the tilt to be corrected, and with large tilts will cause the piston to slide within the cylinder and will hold the correct circuit closed in order to assure proper erection during the starting period of the gyro. For this purpose, the contacts on both sides of the piston are so arranged that they act in the same sense as the jet pipe, in this way utilizing gravity for an increase of the tendency of the compressed air to move the piston in the correct direction.

Because of the horizontal position of the jet pipes, the two torque motors are always active while the gyro is running because the jet pipes will swing from one extreme position to the other as soon as the tilt is sufficient to overcome the bearing friction of the jet pipe suspension. The gyro, therefore, continuously swings around the true vertical, but the amplitudes of these precessions are so small that no disturbances are created.

The two condensers serving to shift the phase of the second winding of the condenser type torque motors are preferably mounted on the lower part of the gyro rotor housing 10. In Fig. 2, condenser 52 is partly visible. Current is conducted to the gyroscope by means of contact springs 55 and 56, the contact points of which are positioned on the gimbal axes. At point 56 (Fig. 1) the opposing contacts have been omitted for reasons of simplicity.

The indication of the gyro position is accomplished in any known way, as by means of a lever 58 pivoted around an axis 57 mounted on the gimbal frame 45. The lever is balanced by a weight 59 and carries a horizon bar 60 on the opposite end. The horizon bar is controlled by a crank pin 61 mounted on the pivot 62 of the inner gimbal axis. Disc 64 is connected to gimbal frame 45 by pivot 63. While in this way the horizon bar in the usual manner follows the relative motions of the gyro around both axes, the disc 64 indicates only the transverse inclinations.

Besides said indicating members, the gyro may be supplied with potentiometer type transmitters 65 and 66 in order to repeat accurately its position at a remote point.

What is claimed is:

1. In a gyro-vertical for aircraft, a gyroscope having a rotor housing mounted in substantially neutral equilibrium, means including an electric torque motor for erecting said gyroscope, a pneumatic-electric relay having a movable member controlling said motor upon displacement thereof, a gravitationally responsive controller mounted on said gyroscope, and air flow means brought into action thereby for actuating said movable member upon tilt of said gyroscope, whereby an erecting torque is applied by said motor to the gyroscope upon tilt thereof.

2. A gyro-vertical as in claim 1 in which said relay is mounted on the rotor housing of said gyroscope in such manner that said movable member is gravitationally responsive to large tilts of said gyroscope in the same sense as if actuated by said controller means in response to said large tilts.

3. A gyro-vertical as in claim 1 in which said electric motor is a single phase reversible motor and in which said motor control means operates to produce one direction of rotation of said motor upon actuation of said movable member in one direction and reverse direction of rotation upon actuation of said movable member in a reverse direction.

4. In a gyro-vertical for aircraft mounted in substantialy neutral equilibrium and having a rotor bearing housing, a jet pipe pivotally mounted on said housing so as to rotate in one sense or another in response to corresponding tilt of said gyroscope, stop means for limiting movement of said pipe in each direction, closely positioned receiving ports for said pipe, a torque motor for precessing said gyroscope, and means including a pneumatic relay connected to said ports for controlling said motor.

5. A gyroscope according to claim 4, characterized by the feature that the jet pipe is pivoted around a substantially vertical axis on the rotor housing of said gyroscope.

6. In a gyro-vertical for aircraft mounted in substantially neutral equilibrium about mutually perpendicular horizontal gimbal axes, a pair of jet pipes pivotally mounted on vertical axes on said gyroscope so as to extend horizontally at right angles to one another and parallel to said gimbal axes so that each of said pipes is rotated about its vertical axis in the direction the gyro tilts about the gimbal axis normally parallel thereto, and a torque motor controlled by said jet pipes for applying a torque about the respective gimbal axis which is normal to the axis of the affected jet pipe.

7. A gyro-vertical for aircraft, comprising a gyroscope mounted in substantially neutral equilibrium, a pendulous device including a horizontally mounted jet pipe normally extending parallel to a gimbal axis and pivoted on said gyroscope about a normally vertical axis, control ports mounted on said gyroscope in proximity to said jet pipe, a pneumatically operated relay operated in response to swing of said jet pipe and having a cylinder connected to said ports and mounted on said gyroscope and also having a piston slidable within said cylinder so as to be subject to tilt of said gyroscope, a torque applying device acting about the gimbal axis perpendicular to said first gimbal axis, and means for controlling said torque device in response to motion of said piston.

8. A gyro-vertical as claimed in claim 7, in which said relay is mounted on the rotor housing of said gyroscope and said piston is gravitationally responsive to tilt of said gyroscope and movable between contacts in response to tilt in the same sense as if actuated by said controller means.

9. In a gyro-vertical for aircraft including a rotor bearing housing gimballed in substantially neutral equilibrium, a pneumatically operated electric relay device on said housing having a normally horizontal cylinder and piston, a torque motor controlled by the relative movements of said cylinder and piston for applying an erecting torque on the gyroscope, gravitational means controlled by tilt of said housing, and pneumatic means controlled thereby and connected to said cylinder for moving said piston, said piston being mounted in said cylinder so that the action of gravity thereon upon tilt of the gyroscope assists the air pressure thereon in moving said piston.

GERT ZOEGE von MANTEUFFEL.
FRITZ WAACK.